US010674025B2

(12) United States Patent
Onecha et al.

(10) Patent No.: US 10,674,025 B2
(45) Date of Patent: Jun. 2, 2020

(54) IMAGE DIGITIZING APPARATUS AND IMAGE DIGITIZING METHOD

(71) Applicants: Hewlett-Packard Development Company, L.P., Houston, TX (US); Javier Onecha, Sant Cugat del Valles (ES); Dorkaitz Alain Vazquez, Sant Cugat del Valles (ES); Oscar Moya, Sant Cugat del Valles (ES); Gianni Cessel, Sant Cugat del Valles (ES)

(72) Inventors: Javier Onecha, Sant Cugat del Valles (ES); Dorkaitz Alain Vazquez, Sant Cugat del Valles (ES); Oscar Moya, Sant Cugat del Valles (ES); Gianni Cessel, Sant Cugat del Valles (ES)

(73) Assignee: Hewlett-Packard Development Company, L.P., Spring, TX (US)

( * ) Notice: Subject to any disclaimer, the term of this patent is extended or adjusted under 35 U.S.C. 154(b) by 0 days.

(21) Appl. No.: 16/099,611

(22) PCT Filed: Jun. 30, 2016

(86) PCT No.: PCT/EP2016/065353
§ 371 (c)(1),
(2) Date: Nov. 7, 2018

(87) PCT Pub. No.: WO2018/001488
PCT Pub. Date: Jan. 4, 2018

(65) Prior Publication Data
US 2019/0149679 A1    May 16, 2019

(51) Int. Cl.
*H04N 1/00* (2006.01)
*B65H 3/06* (2006.01)
*B65H 5/06* (2006.01)

(52) U.S. Cl.
CPC ....... *H04N 1/00602* (2013.01); *B65H 3/0669* (2013.01); *B65H 5/06* (2013.01); *H04N 1/0057* (2013.01); *H04N 1/00594* (2013.01); *H04N 1/00604* (2013.01); *H04N 1/00628* (2013.01)

(58) Field of Classification Search
CPC .......... H04N 1/00602; H04N 1/00594; H04N 1/00628; B65H 3/0669; B65H 5/06
See application file for complete search history.

(56) References Cited

U.S. PATENT DOCUMENTS 4,508,444 A *  4/1985  May .................. G03B 27/6264
                                                 271/10.09
5,823,454 A   10/1998  Erck
6,151,140 A   11/2000  Wilcox
(Continued)

FOREIGN PATENT DOCUMENTS

EP         0473167 A1    3/1992

*Primary Examiner* — Iriana Cruz
(74) *Attorney, Agent, or Firm* — HP Inc. Patent Department

(57) ABSTRACT

An image digitizing apparatus has an image digitizing sensor to read an image from media passing the image digitizing sensor, and a transport to move the media past the image digitizing sensor. The transport includes a first driven transport element, and a second driven transport element biased towards the first driven transport element. The first driven transport element and the second driven transport element receive the media therebetween.

18 Claims, 14 Drawing Sheets

(56) References Cited

U.S. PATENT DOCUMENTS

| | | | |
|---|---|---|---|
| 6,378,858 B1 * | 4/2002 | Suga | B65H 3/0669 271/10.01 |
| 7,249,760 B2 | 7/2007 | Liu et al. | |
| 7,769,322 B2 | 8/2010 | Ishihara et al. | |
| 8,289,590 B2 | 10/2012 | Furihata et al. | |
| 8,998,195 B2 | 4/2015 | Hong et al. | |
| 2008/0061495 A1 * | 3/2008 | Shiraki | B65H 5/06 271/119 |
| 2011/0074089 A1 * | 3/2011 | Deas | B65H 29/125 271/4.1 |
| 2014/0036323 A1 * | 2/2014 | Kaempflein | H04N 1/04 358/482 |
| 2014/0347712 A1 | 11/2014 | Yoneyama et al. | |

* cited by examiner

IMAGE DIGITIZING APPARATUS AND IMAGE DIGITIZING METHOD

BACKGROUND

An image digitizing apparatus, for example a scanner, includes a sensor to read data from media that is moved peat the sensor by a transport including a pair of transport elements. An image digitizing apparatus may be used as a standalone device, e.g., a standalone scanner, or may be part of an image forming apparatus, e.g., a printer or a copier.

BRIEF DESCRIPTION OF THE DRAWINGS

FIG. 2 shows of a sensor of an image digitizing apparatus in accordance with several examples.

FIG. 6 shows mechanical couplings of first and second transport elements of the transport of a scanner in accordance with several examples.

FIG. 9 illustrates a mechanical coupling in accordance with an example that remains coupled even when the housing parts are separated.

DETAILED DESCRIPTION

Figure 1:
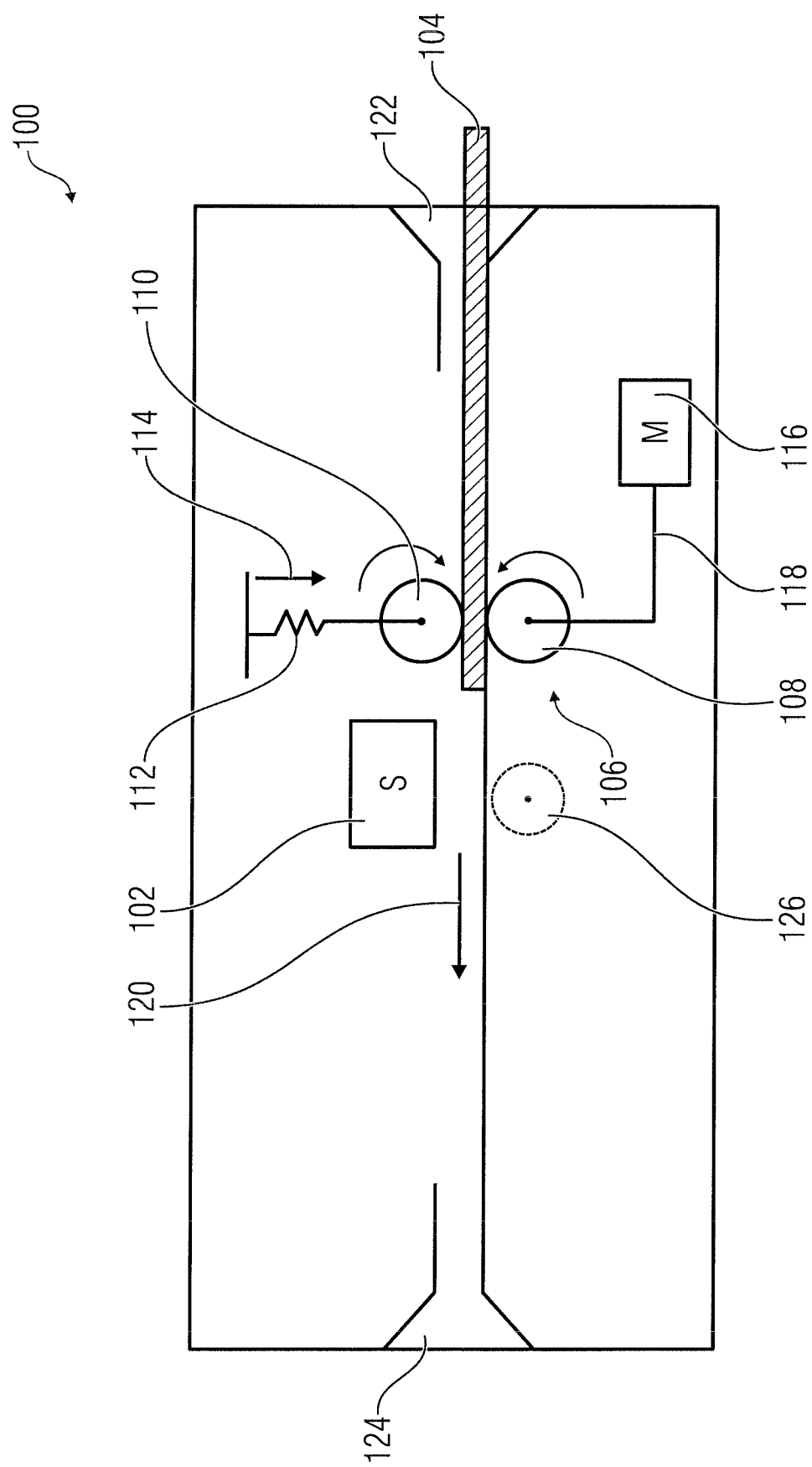
FIG. 1 is a schematic illustration of an image digitizing apparatus in accordance with an example.

FIG. 1 is a schematic illustration of an image digitizing apparatus, also referred to as a scanner, in accordance with an example. The scanner 100 includes a sensor 102 to read an image from a medium 104, for example a paper sheet, as the medium 104 passes the sensor 102. The scanner 100 includes a transport 106 including a first transport element 108, also referred to as a scanner traction shaft, and a second transport element 110, also referred to as a scanner pressure shaft. The medium 104 is received between the first transport element 108 and the second transport element 110, e.g. first and second rollers. As is schematically indicated by the spring 112, the second transport element 110 is biased towards the first transport element, as is indicated by arrow 114. The first transport element 108 may be located at a fixed position, however, in accordance with other examples, both transport elements 108, 110 may be biased towards each other or, in accordance with yet other examples, the first transport element 108 may be biased towards the second transport element 110 which may be located at a fixed position. In the example of FIG. 1, the second transport element 110, which is biased towards the first transport element 108, may also be referred to as a pressure transport element. The first transport element 108 is an active element in that it is driven by a motor 116 that is coupled to the first transport element 108, as is indicated schematically by line 118. The second transport element 110 is a non-driven element and rotates when the first transport element 108 is driven by the motor 116.

When located between the first and second transport elements 108, 110, and when the first transport element 108 is driven by the motor 116, the medium 104 is moved in a media transport direction 120 so as to pass the sensor which reads an image from the medium 104 and provides data representing the image which may be used for further processing, for example to generate an electronic version of the image provided on the medium 104 or to provide data which may be used for forming a copy of the image by printing out the image using the data read by the sensor. In accordance with examples, the sensor 102 may be a sensor reading the image while the medium 104 is continuously moved past the sensor 102. In accordance with other examples, the sensor 102 may be a sensor which reads the image from the medium 104 when the medium is stopped beneath the sensor 102 and, in such an example, the motor 116 may be a stepper motor to intermittently drive the first transport element 108.

In the example of FIG. 1, the scanner 100 includes an input 122 to receive the medium 104 bearing the image to be scanned by the sensor 102, and an output 124 for outputting the medium 104 once the scan is completed. The input 122 and the output 124 are on opposite sides of the scanner 100. However, in accordance with other examples, the input 122 and the output 124 may be on the same side of the scanner so as to allow feeding the medium to be scanned and retrieving the scanned medium easily from the same side.

In accordance with examples, the sensor 102 may be a CCD sensor (CCD charge coupled device) including CCD elements and optical elements for scanning the image on the medium 104. In accordance with other examples, the sensor 102 may be a CIS (CIS=contact image sensor). When implementing the sensor 102 as a CIS sensor the medium 104 and the sensor 102 may be in contact with each other. The contact may be established by providing a contact roller 126 shown in dotted lines in FIG. 1.

Figure 2A:
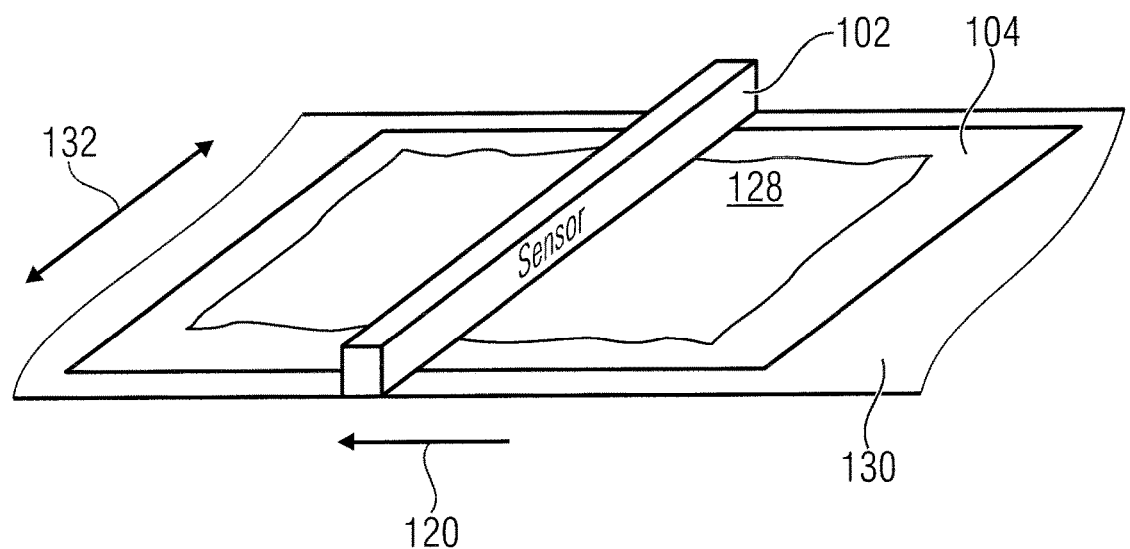
FIG. 2A shows a single sensor element extending across a media path.
Figure 2B:
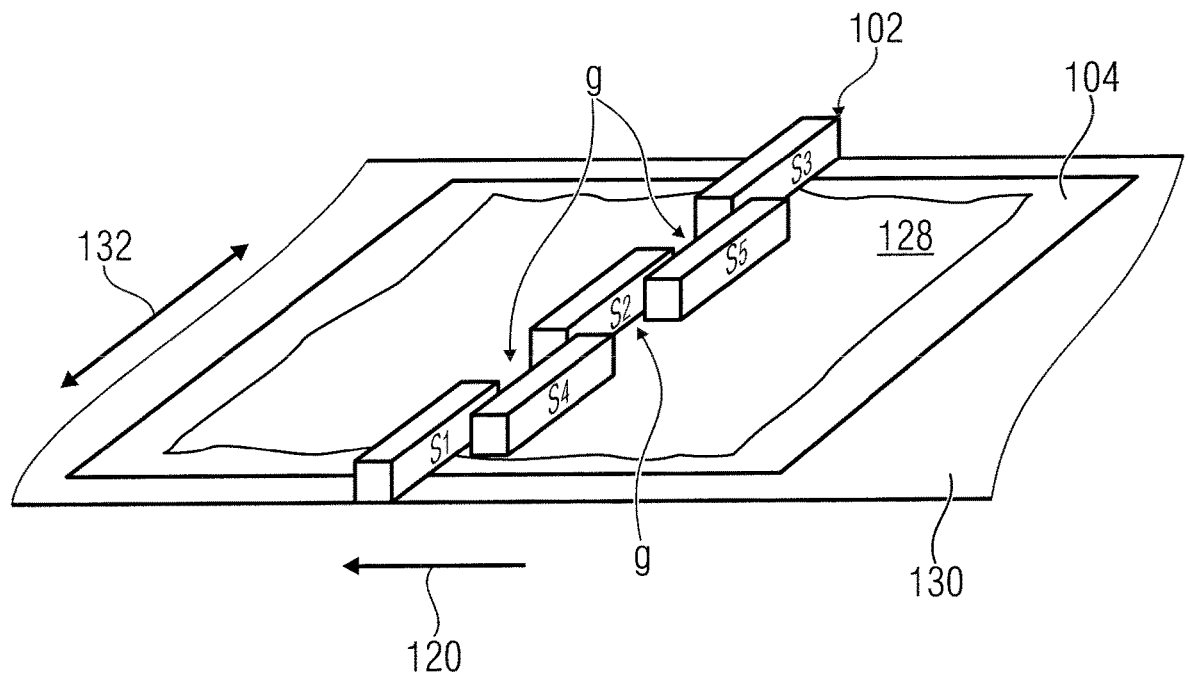
FIG. 2B shows a sensor having two lines of sensor elements.

FIG. 2 shows examples of the sensor 102. FIG. 2A shows a single sensor element extending across the media path, and FIG. 2B shows a sensor having two tines of sensor elements. In FIG. 2A the medium 104 moved partially along the media transport direction 120 past the sensor 102. The medium 104 is moved along the media transport direction 120 along a media path through the scanner, and the sensor 102 includes a single element for reading an image 128 from the medium 104. The sensor 102 extends across the media path 130 along which the medium 104 is moved. FIG. 2A shows a single sensor element, however, in accordance with other examples, the sensor 102 may include a plurality of consecutive sensor elements arranged side-by-side along a direction 132 across the medium 104. The direction 132 is substantially perpendicular to the media transport direction 120.

FIG. 2B shows another example for realizing the sensor 102. The sensor 102 has a plurality of scanning element S1 to S5 which are arranged along the direction 132 across the medium 104. The sensor 102 includes a first line of sensor elements S1, S2 and S3, and a second line of sensor elements S4 and S5. The first line of sensor elements defines a first scanning zone across the media path, and the second line of sensor elements defines a second scanning zone across the media path. The second scanning zone, with respect to the movement direction of the media past the image digitizing sensor, is located further downstream than the first scanning zone. With respect to the media transport direction 120, the first line of sensor elements S1 to S3 is further downstream than the second line of sensor elements S4 and S5. In accordance with examples, along the media transport direction 120, the sensor elements in the respective lines may be arranged with a gap or may be arranged immediately abutting each other. In the direction 132 across the medium 104, also referred to as substrate, the respective sensor elements S1, S2, S3 in the first line and the respective sensor elements S4 and 5 in the second line are arranged with a gap g along the direction 132. The sensors S1 to S3 in the first line extend from one side of the media path 130 to the opposite side thereof, whereas the sensor elements S4, S5 are arranged at a distance from the respective edges of the media path 130 along the direction 132. In accordance with other examples, the arrangement of sensor elements may be different in that an additional sensor element is provided in the second line so as to extend to the second or opposite side of the media path 130. In such an example, the first line of sensor elements starts at the first side of the media path 130 and ends at a distance from the second side, whereas the second line of sensor elements starts at a distance from the first side of the media path 130 and ends at the second side. In the example of FIG. 2B, the sensor elements S4 and S5 in the second line of sensor elements are arranged such that they overlap, with respect to the media transport direction 120, the gaps g in the first line of sensor elements. Further, in accordance with the depicted example, the sensor elements S4 and S5 also partially overlap with the sensor elements S1, 32 and S2, S3, respectively. In accordance with other examples, the sensor elements S4 and S5 may be dimensioned such that they cover the gaps g in the first line of sensor elements. In the example of FIG. 2B, the sensor elements S1 to S5 are shown as single units. However, in accordance with other examples, the sensor elements S1 to S5 may include a respective set of smaller sensor units arranged side-by-side.

The scanner described in the example of FIG. 1 and FIG. 2 scans an image from a medium so as to generate an electronic version of the image that may be used for further processing, for example for generating an electronic file that may be stored electronically instead of the original hardcopy, for example, invoices or letters. The electronic file of the image generated by the scanner may also be used for transmitting the document electronically, for example, via e-mail or for incorporating the image into another electronic file, for example, an electronic document. In accordance with other examples, the electronic version of the image as read from the medium may be used in a printer or in a copier to reproduce the image on a print medium, for example by an electro photographic printing process or an ink jet printing process.

Figure 3:
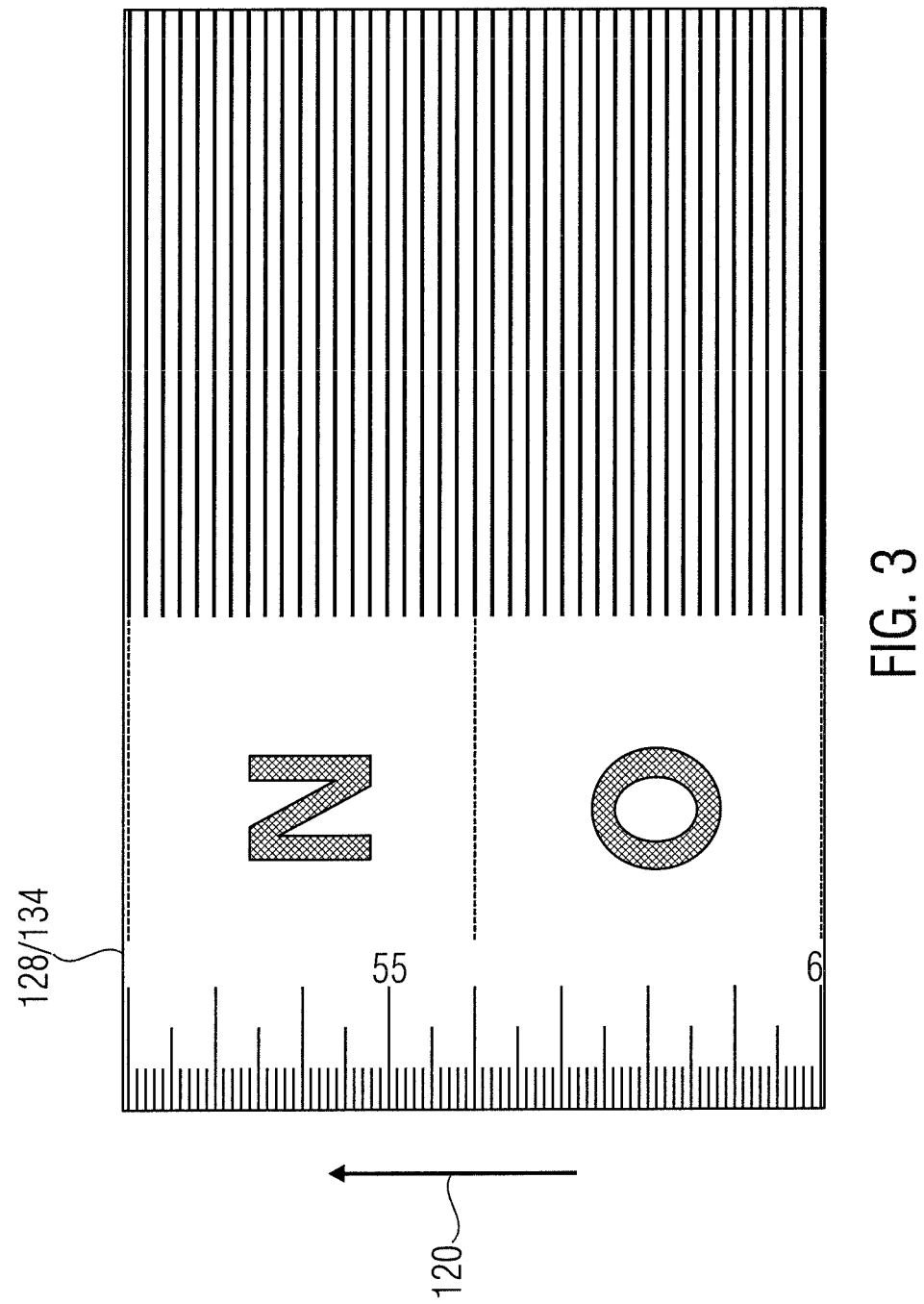
FIG. 3 shows an image to be scanned in accordance with an example.

FIG. 3 shows an example of an image 128 to be scanned. The image 128 may be provided on a medium and, to be scanned, is transported along the media transport direction 120. The image 128 may be a specific test pattern allowing to evaluate the accuracy of the scanning process of the scanner 100. By scanning the image 128 an electronic version of the image, also referred to as the scanned image 134, is produced. Scanning the original image 128 by the scanner 100 may yield a scanned image that has a reduced quality due to image defects in the scanned image.

FIG. 4 shows examples of image defects that may be generated in a scanner having a sensor 102 with a configuration as explained with reference to FIG. 2A or with reference to FIG. 2B.

Figure 4A:
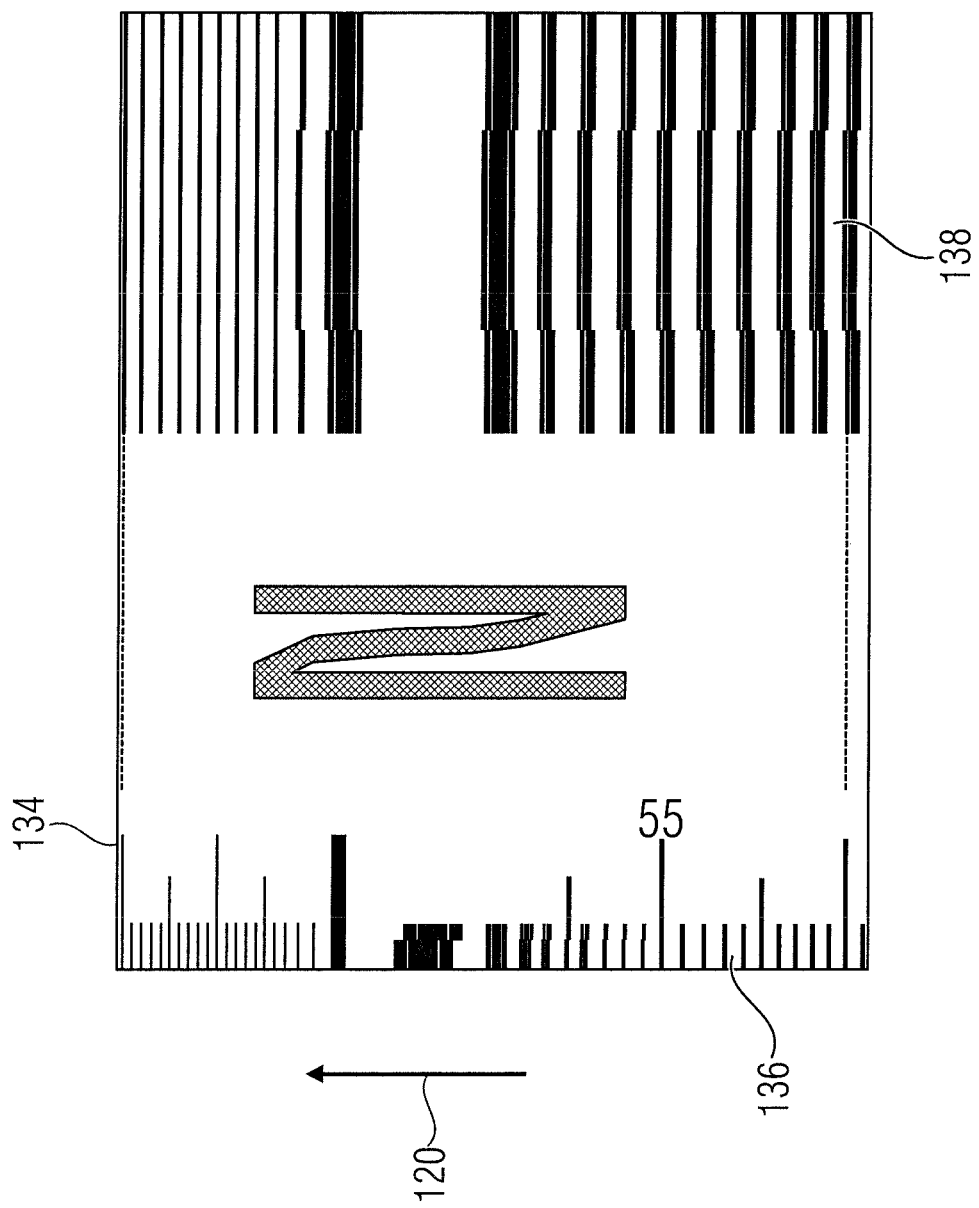
FIG. 4A shows an image defect in an upper part of the image of FIG. 3 scanned by a scanner having a sensor arrangement as shown in FIG. 2A, and FIG. 4B and FIG. 4C show image defects in an upper part of the image of FIG. 3 scanned by a scanner having a sensor arrangement as shown in FIG. 2B.

FIG. 4A shows the upper part of the image 128 scanned by a scanner having a sensor arrangement as shown in FIG. 2A. The scanned image 134 does not have the same size as the original image 128. The letter N has a length along the media transport direction 120 which is longer than the letter N in the original image 128 (see FIG. 3). Furthermore, the scale 136 provided at the left-hand part of the image, along the media transport direction 120, has sections where the distances among the scale divisions are not of uniform length. Moreover, the line pattern 138 provided at the right-hand side of the image, in the scanned image, has a section where the line spacing is not uniform, whereas, in the original image 128 (see FIG. 3), both the scale division and the line spacing is uniform.

Figure 4B:
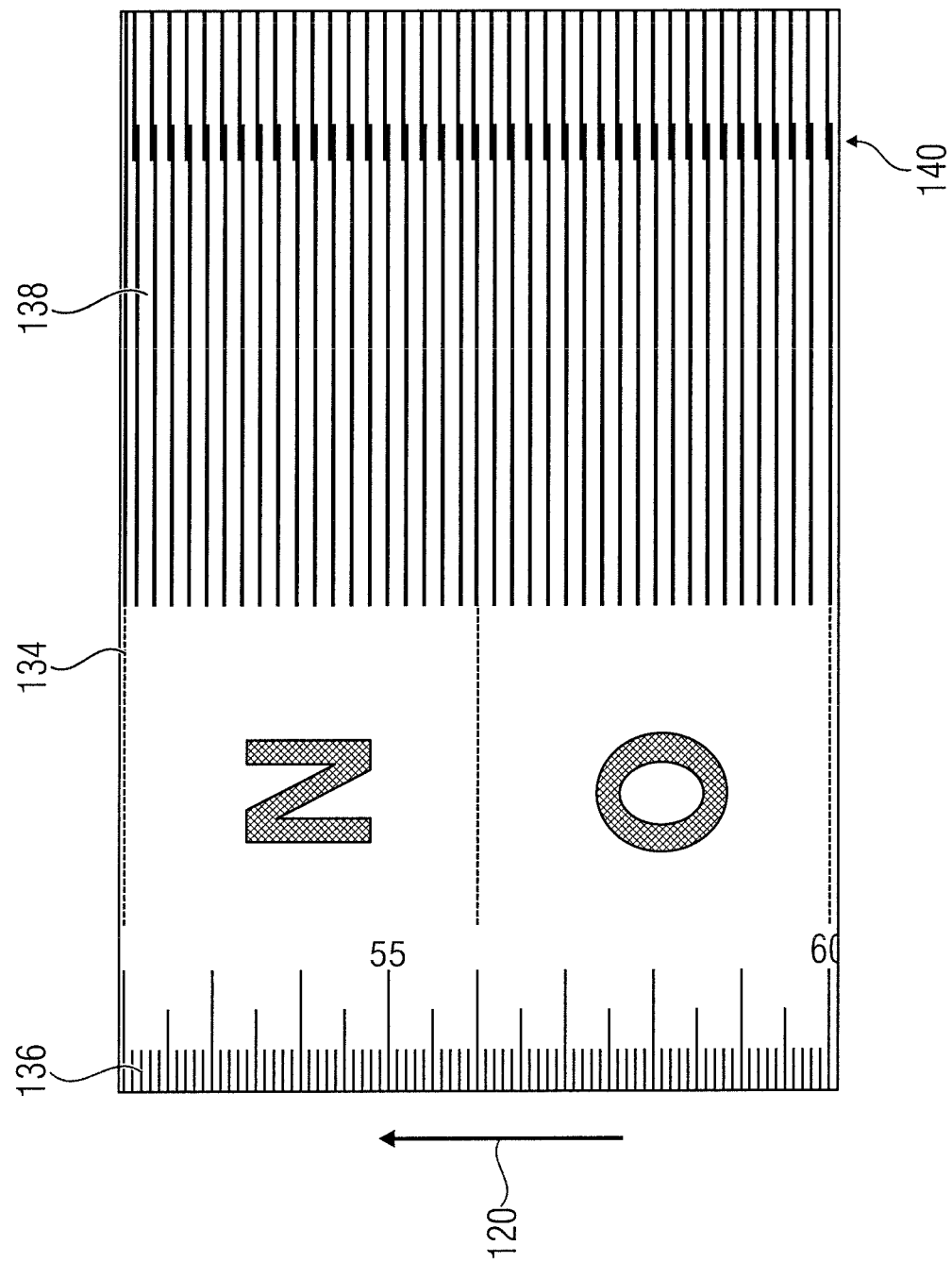
FIG. 4 shows image defects when scanning the image of FIG. 3.

FIG. 4B shows a scanned image 134 obtained by scanning the original image 128 (see FIG. 3) with the sensor arrangement of the example of FIG. 2B. While the letters and also the scale 136 are reproduced correctly, a defect 140 is in the line pattern 138 where the scanned image is generated by the overlapping portion of the sensors 33 and S5 in FIG. 2B. The defect 140 is such that the respective lines in the line pattern 138, contrary to the original image 128, are not shown as continuous lines. The defect 140 is an offset of the lines along the media transport direction 120.

Figure 4C:
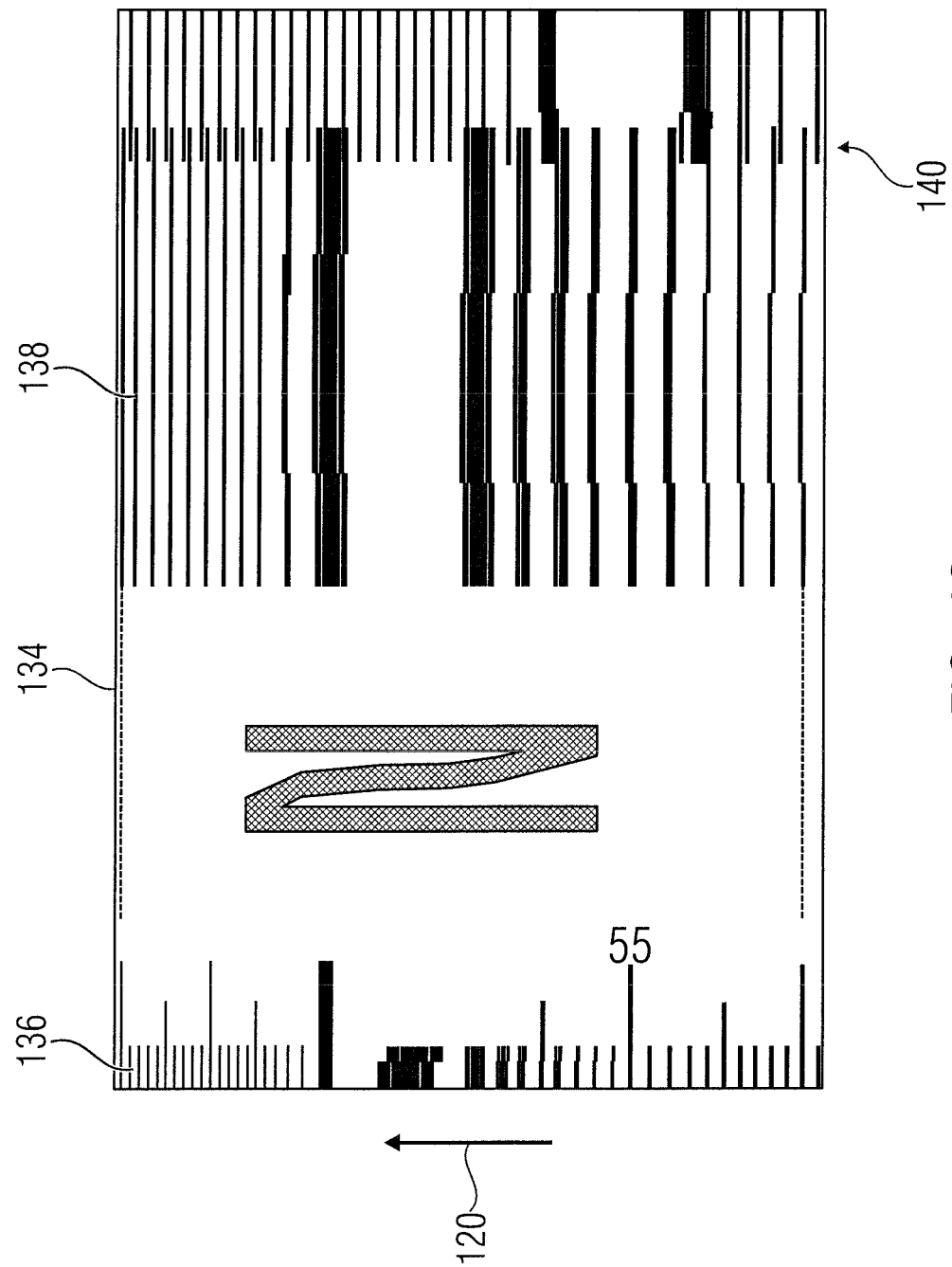

FIG. 4C shows another example of a scanned image 134 generated by scanning the original image 128 (see FIG. 3) by a sensor arrangement of the example of FIG. 2B. In addition to the defect 140 discussed above with respect to FIG. 4B, a defect as explained with reference to FIG. 4A may also occur when using the sensor arrangement of FIG. 2B in that the scanned image 134, at respective sections thereof, has a length which is increased when compared to the length along the media transport direction 120 in the original image 128.

The image defects in the scanned image 134 discussed above with reference to FIG. 4A to FIG. 4C may be experienced despite the fact that following the scanning of the image a correction process is applied to correct image defects in the scanned image.

An investigation of the reasons for the image defects generated by a scanner revealed that the image defects may be, for example, due to a sliding of the medium during the scanning process. The defect explained with reference to FIG. 4A is that the scanned image does not have the same length as the original image as due to the sliding of the medium the scanning speed is reduced. The defect explained with reference to FIG. 4B is due to an image misalignment of the images generated by a plurality of sensor elements. For example, large format scanners may have a plurality of sensors arranged in accordance with the example of FIG.

2B, and the sliding of the medium may result in different scanning speeds at the sensors causing the visible misalignments, for example in the horizontal lines of an image.

It was found that the above discussed defects in the scanned image may occur dependent on the type of medium, on which the image to be scanned is provided. For example, glossy paper, which may be provided with a heavy weight coating, causes sliding of the medium due to its rigidity and high resistance against movement. Image defects as discussed above may be avoided by reducing the speed at which the medium is transported through the scanner from a first speed to a second speed which is lower than the first speed. However, this may result in a low scanner performance in terms of throughput. Another approach to avoid the above mentioned image defects in the scanned image may be to increase the normal traction force provided by the two transport elements for moving the medium past the sensor. For example, one of the transport elements may be a pressure element providing a normal force towards the first transport element so as to produce a sufficient traction force when the medium is between the two transport elements. The normal force applied by the second transport element may be increased, thereby increasing the friction force between the medium and the rollers. However, while this may reduce or avoid the above discussed image defects, it may have a detrimental effect on the medium itself in that defects are formed in the medium, for example the increased pressure of the second transport roller may cause marks in the scanned medium. The scanned medium may be an original that is unique, so that defects in the original medium are to be avoided.

The above described defects in the scanned image, as mentioned, may occur dependent on the type of medium used. However, it was further found that the defects may occur independent of the type of medium due to the transport of the medium 104 along the media path 130 from the input of the scanner towards the output thereof. For example, when transporting the medium 104 past the sensor it may be that the already scanned part of the medium receives an increased friction in the output path of the scanner due to a friction between the medium and the material used for forming the media path. There may also be scanners in which the media path 130 is not a straight path through the scanner but is a path having a curve along which a medium to be scanned and/or the medium following the scan is moved. To move the medium along curved segments of the media path a guide element may be provided which engages with the medium so as to move it around the curved segments. The impact of the medium with the guide element and also the bending of the medium around the curved segment may cause an increased resistance against the movement of the medium. The increased resistance against the movement may cause the sliding of the medium between the transport elements.

Figure 5:
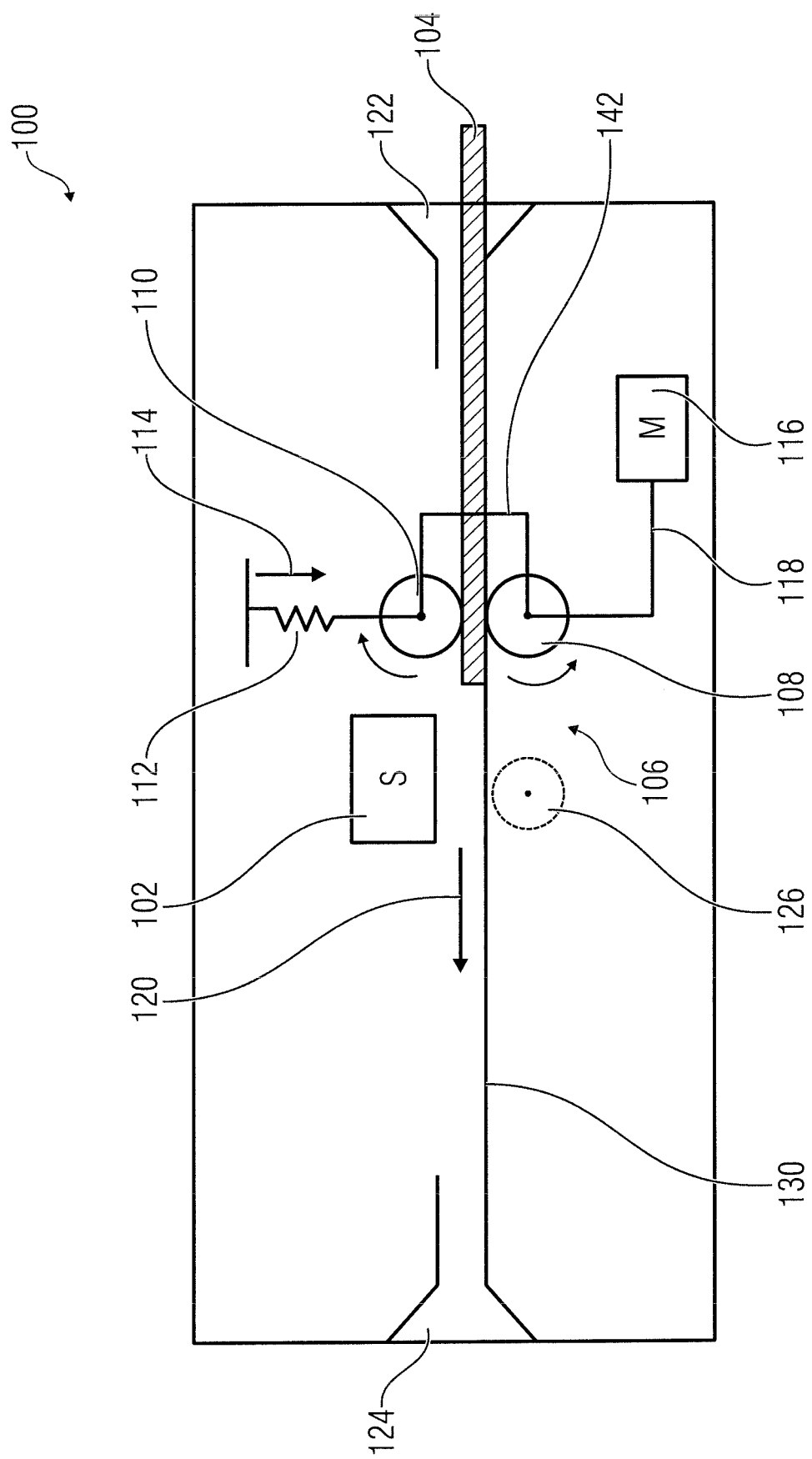
FIG. 5 is a schematic illustration of an image digitizing apparatus in accordance with an example.

In accordance with examples an image digitizing apparatus is provided in which sliding of the medium is reduced or avoided without causing a reduction in the scanning speed and without causing marks on an original image to be scanned. FIG. 5 is a schematic illustration of an image digitizing apparatus in accordance with an example of the techniques described herein. The scanner 100 is similar to the one explained above with reference to FIG. 1. The scanner 100 includes the image digitizing sensor 102 to read an image from media 104 passing the image digitizing sensor 102. The transport 106 is provided to move the media 104 past the image digitizing sensor 102. The transport 106 includes the first transport element 108 and the second transport element 110. The first transport element 108 and the second transport element 110 receive the media 104 therebetween. The first transport element 108 is a driven transport element, for example it is driven by the motor 116, as is schematically represented by the line 118. The second transport element 110 is biased towards the first transport element 108. In accordance with other examples, the transport 108 described with reference to FIG. 1 may be used. In accordance with examples, the scanner 100 is a large format scanner. In accordance with examples, a large format scanner is a scanner which scans a medium having a width of 20 inches or more. There is no limitation regarding the medium length.

Figure 6A:
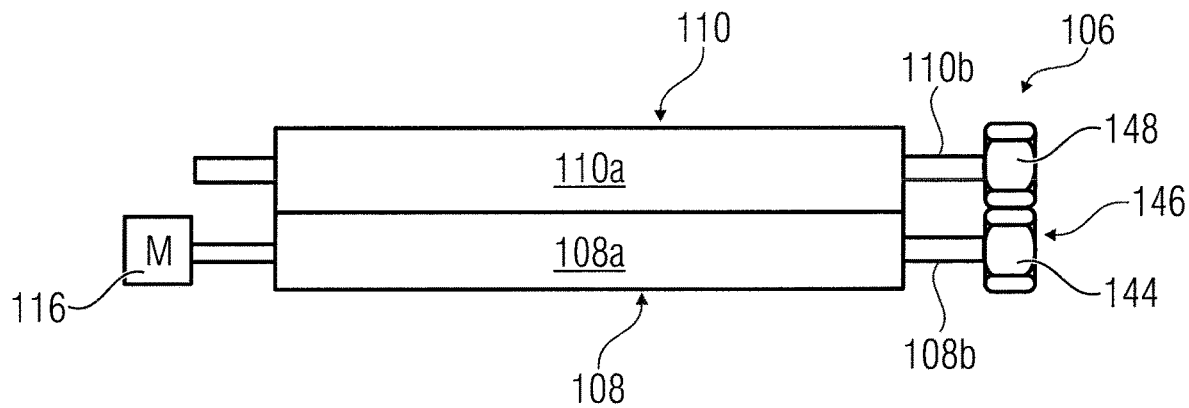
FIG. 6A illustrates the coupling of two transport rollers by a gear mechanism.

FIG. 6 shows examples for providing a mechanical coupling of the first and second transport elements depicted in FIG. 5. FIG. 6A shows an example of the transport 106 including the first and second transport elements 108, 110. The first transport element 108 includes a roller 108a mounted to a shaft 108b. The shaft is rotatably mounted to a housing of the scanner. A first end of the shaft 108b is connected to the motor 116. A first gear 144 of a gear mechanism 146 is mounted to the second end of the shaft 108b. The second end is opposite to the first end of the shaft 108b at which the motor 116 is located. The second transport element 110 includes a roller 110a and a shaft 110b also mounted to the housing of the scanner. A second gear 148 of the gear mechanism 146 is mounted to an end of the shaft 110b of the second transport element so as to engage with the first gear 144. The gears are selected such that the transport rollers 108a, 110a operate in synchronism with each other. The gears 144, 148 are selected such that the rotation speed of the second transport roller 110a corresponds to the rotation speed of the first transport roller 108a. Further, the gears 144, 148 are selected such that the rollers rotate in opposite directions to move the medium. In accordance with other examples, the gear mechanism may include more than two gears which are selected such that the rotation speed of the transport elements is the same and that the rotation direction is opposite to each other.

Figure 6B:
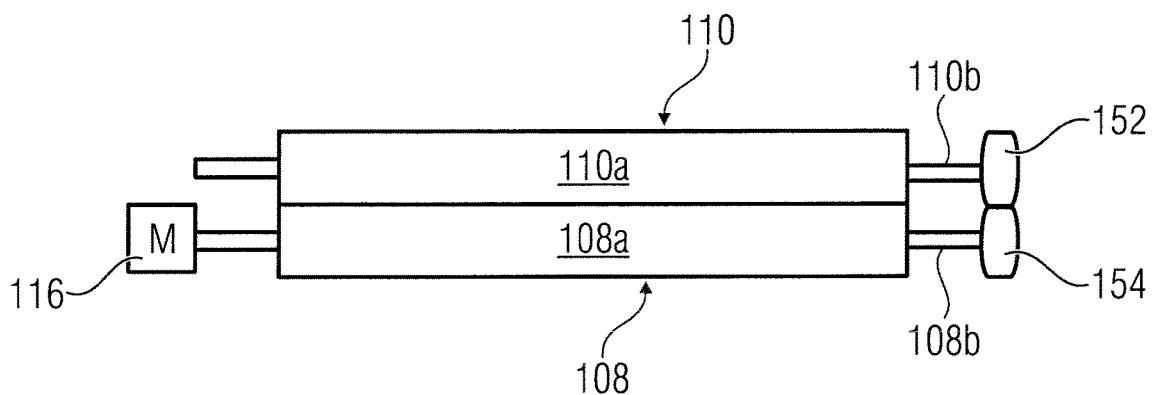
FIG. 6B illustrates the coupling of two transport rollers by friction wheels.

FIG. 6B shows another example for the mechanical coupling of the first and second transport elements of the transport 106. Instead of providing first and second gears, which are mounted to respective ends of the shaft 108b, 110b of first and second transport elements 108, 110, friction wheels 154, 152 are provided.

Figure 6C:
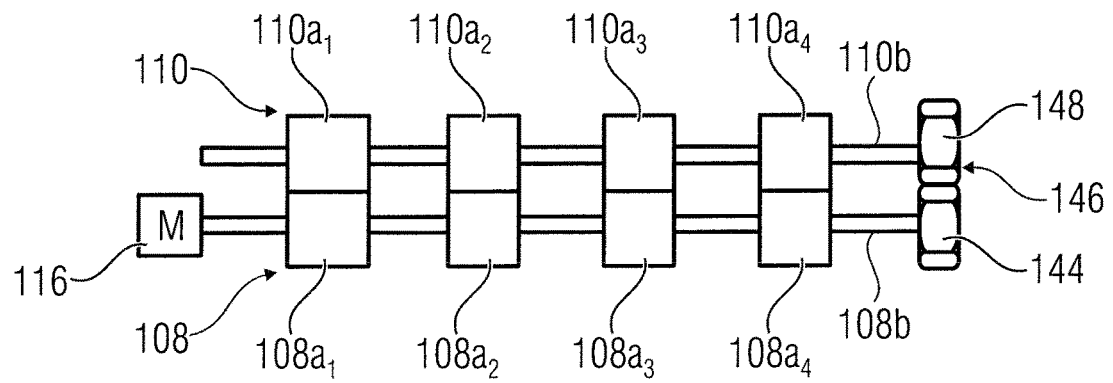
FIG. 6C illustrates transport elements having a plurality of rollers or discs coupled by a gear mechanism.

FIG. 6C shows another example, of the transport 106. In the example of FIG. 6, the first transport element 108 includes a plurality of discs or rollers $108a_1$ to $108a_4$ located spaced apart from each other on the shaft 10b. In a similar way, the second transport element 110 includes the plurality of discs or rollers $110a_1$ to $110a_4$ located separated from each other on the shaft 110b and arranged opposite to the discs $108a_1$ to $108a_4$ of the first transport element. The transport elements 108, 110 are coupled by the gear mechanism 146 described with reference to FIG. 8A. However, in accordance with another example, the transport elements 108, 110 may also be coupled by respective friction wheels as described in the example of FIG. 6B.

In the examples described with regard to FIG. 6A to FIG. 6C, the rollers 106, 110 or the discs $108a_1$ to $108a_4$, $110a_1$, $110a_4$ may be formed from a material having a high friction coefficient with regard to the medium to be transported, for example, one of the first and second transport elements or both of the first and second transport elements may be formed from rubber, such as NBR (NBR=nitrile butadiene rubber). In accordance with other examples, other materials may be used for the transport elements of the transport 106.

Image defects, as described above with regard to FIG. 4, are avoided without slowing down the scanning speed and without causing defects in the original medium, by driving the second transport element 110. In the example of FIG. 5, the second transport element 110 is mechanically coupled to the first transport element 108 so as to be driven in synchronism with the first transport element 108, as schematically represented by the line 142. By making the passive second transport element 110 an active element, the traction force applied to the medium is increased which, in turn, reduces or avoids sliding of the medium which is recognized as a cause for the above described image defects in the scanned image.

Adding traction to the second transport element increases the friction coefficient with the medium transported due to the additional friction of the second transport element with the medium.

In addition to the friction between the driven transport element 1088 and the medium, a friction between the second transport element and the medium is added due to the pushing of the medium also by the second driven transport element on the side of the medium which is opposite to the first transport element. The material of the second transport element may be the same as that of the first transport element or may be different. For example, when using NBR or silicone o-rings for the transport elements, a friction coefficient with the medium of at least 1.6 in the case of NOR and of at least 1.2 in case of silicone may be obtained, for example for a medium including a glossy paper. This means that maintaining the normal force provided by the second transport element towards the first transport element unchanged, the friction force may be doubled, thereby providing for a sufficient traction force even in situations in which the medium, when moved through the scanner, is subjected to additional friction along the media path resulting in an increased resistance against the movement. Applying the above examples for the transport reduces or avoids sliding of the medium as, due to the increased traction force, the medium is reliably transported through the scanner. The above described image defects may be avoided or at least reduced to an extent that the defects are at least not readily visible in the scanned image.

The increased traction force provided by the coupled transport elements allows a reliable movement of medium through the scanning area also at a higher scanning speed. A specific media is not scanned at a reduced speed which is below the scanner's capacity, thereby allowing for a fester scanning process.

Figure 7:
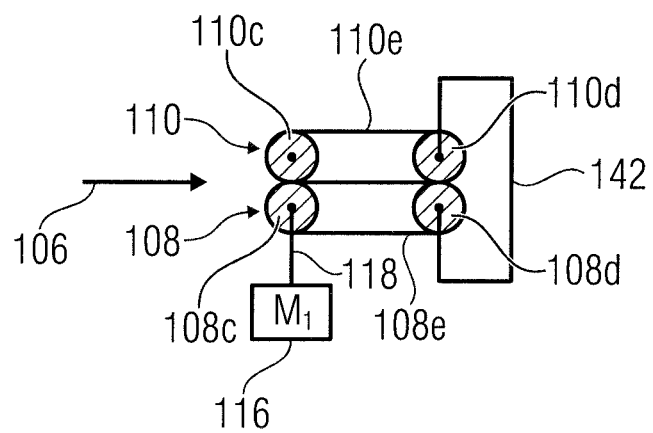
FIG. 7 shows a transport having first and second belt drives in accordance with an example.

In the examples described above, the first and second transport elements were described to include rollers or discs mounted to a shaft. FIG. 7 shows another example of a transport 106 having first and second belt drives. The first transport element includes a first belt drive roller 108c and a second belt drive roller 108d. The belt drive rollers 108c and 108d are separated from each other by a predefined distance along the medium movement direction. The transport element 108 includes a belt 108e extending around the respective belt drive rollers 108G, 108d. The first belt drive roller 108c is driven by the motor 116, as is schematically represented by the line 118 between the first belt drive roller 108c and the motor 116. In other examples, the second belt drive roller 108d may be driven. The second transport element 110 has a similar structure as the first transport element 108 and includes a first belt drive roller 110c and a second belt drive roller 110d located in a similar way as the respective belt drive rollers of the first transport element. The second transport element 110 includes a belt 110e extending around the belt drive rollers 110c, 110d The transport elements 108, 110 receive the medium between the belts 108e, 110e for moving it along the media path. The upper and lower transport elements may be mechanically coupled with each other in a way as described in the examples of FIG. 6, as is schematically represented at 142. The coupling may be by a gear mechanism or by friction wheels.

Figure 8:
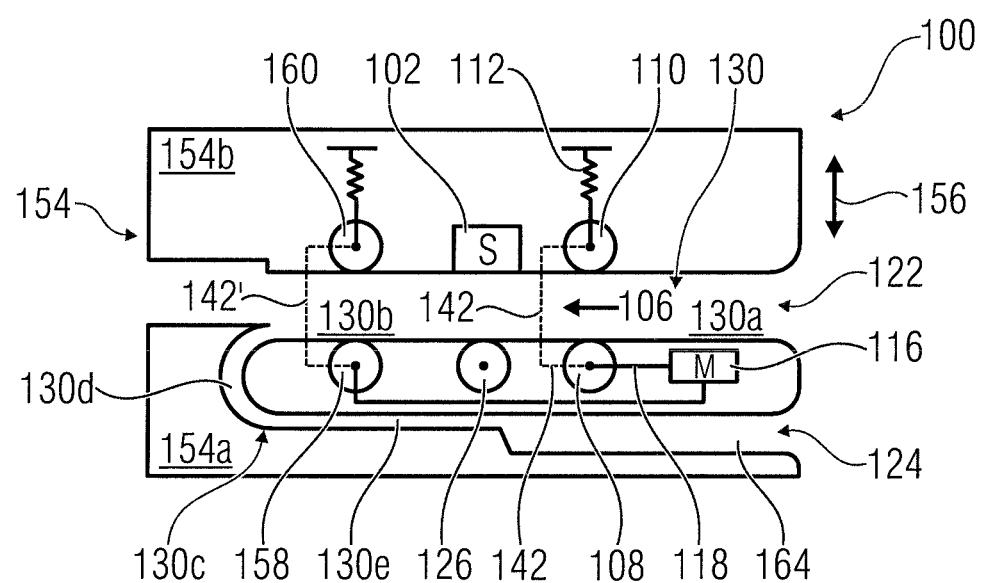
FIG. 8 is a schematic illustration of an image digitizing apparatus in accordance with another example.

FIG. 8 shows a scanner in accordance with another example. The scanner 100 includes those elements described above with reference to FIG. 5. Additionally, the scanner 100 comprises a housing 154 including a first lower housing part 154a and a second, upper housing part 154b. The lower and upper housing parts 154a, 154b are schematically shown to be moveable with respect to each other, as indicated by arrow 156. The separation of the housing parts 154a, 154b may be such that the upper housing part 154b is lifted from the lower part 154a. In other examples, the upper and lower housing parts 154a, 154b may be connected with each other at the side opposite to the input 122 so that the respective parts may be pivoted with respect to each other so as to open the media path. Separating the upper and lower housing parts 154a, 154b, for example, allows to remove a medium in case of a jam or for cleaning elements along the media path, such as the scanner surface and the transport elements.

The input 122 to receive the medium and the output 124 to output the scanned medium are provided on the same side of the scanner 100, thereby allowing a user to operate the scanner from one side.

The transport 106 includes a first transport element pair including the transport elements 108, 110 and a second transport element pair including a third transport element 158 and a fourth transport element 160. The structure of the second transport element pair 158/160 may be the same as the structure of the first transport element pair 108/110. In other examples, a combination of the transport element pairs described above may be used for the first and second transport element pairs 108/110, 158/160. The second transport elements 110, 160 are provided in the upper housing part 154b, and the mechanical couplings 142, 142' between the respective first and second transport elements include a mechanical connection that disengages when the housing parts 154a, 154b are separated and the re-engages when bringing the two housing elements together again. For example, when using a gear mechanism as in FIG. 6A or the friction wheel as in FIG. 6B, upon separation of the housing parts 154a, 154b, also the respective gears 144, 148 or friction wheels 152, 154 disengage. The respective gears 144, 148 or friction wheels 162, 154 re-engage each other, when closing the housing 154 again. In another example, the mechanical coupling may remain when the housing parts are separated from each other. Examples for such mechanical couplings are described further below. The second transport element pair 158/180 including the coupled transport elements supports the transport of the medium through the scanner, as also the portion of the scanned medium is transported. In accordance with examples, the second transport element pair 158/160 may also be provided in the scanner of FIG. 5.

In the example of FIG. 8, the media path 130 includes an input section 130a extending from the input 122 towards the sensor 102, a scanning section 130b arranged between the transport element pairs 108/110, 158/160, with the scanner 102 located between the respective transport element pairs. The media path further includes an output section 130c having a curved section 130d to provide, for example, a U-turn of the medium after scanning thereof, as well as a straight section 130e extending towards an output tray 164 at the output 124 for receiving the scanned medium. When moving the medium through the media path end when entering the curved section 130d an increased resistance against the movement of the medium is experienced as the medium gets into contact with a u-shaped guide element and the medium is bent. The coupled transport element pairs provide a traction force to the medium sufficient to overcome any increased resistance against the movement of the medium along the media output path 130c, thereby avoiding the above described sliding of the medium and the image defects or artifacts in the scanned image.

Figure 9A:
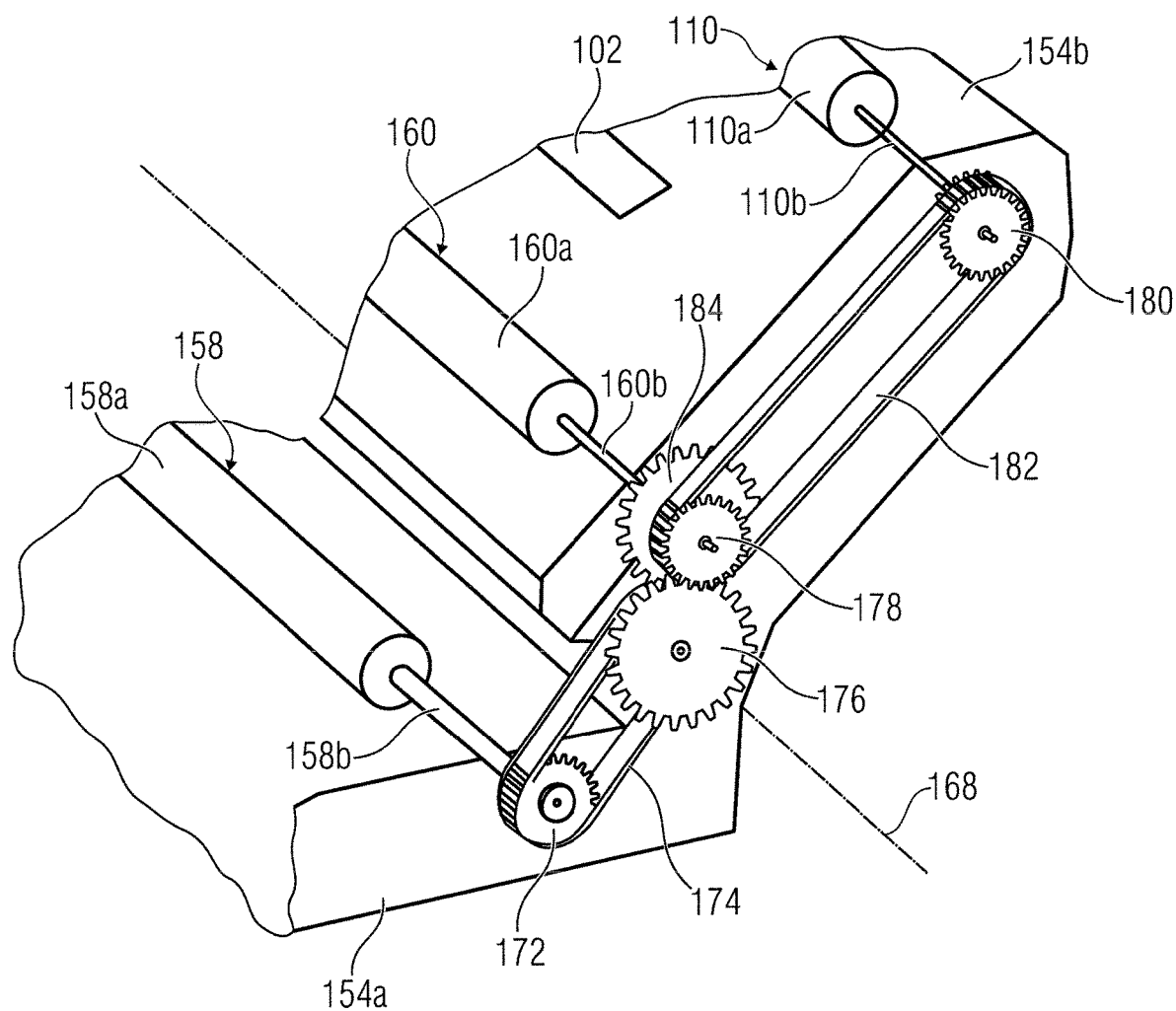
FIG. 9A is a schematic illustration of a part of the device of FIG. 8 in an isometric view.

FIG. 9 illustrates a mechanical coupling that remains coupled when the housing parts 154a, 154b are separated. FIG. A is a schematic illustration of a part of the device of FIG. 8 in an isometric view with the housing parts 154a, 154b separated from each other. The first transport element of the first transport element pair, not shown in FIG. 9A, is coupled to the first transport element 158 of the second transport element. The roller 158a and the shaft 158b of the first transport element 158 of the second transport element pair are shown in FIG. 9A, and a first gear 172 is mounted to the end of the shaft 158b of the frat transport element 158 of the second transport element. A second gear, not shown in FIG. 9A, is mounted at the location of the pivot axis 168. A belt 174 extends around the first gear 172 and the second gear. An intermediate gear 176 is mounted at the pivot axis 188 so as to be rotated together with the second gear. The rotation of the driven shaft 158b is transferred via the belt transfer mechanism to the intermediate gear 176. The upper transport elements include respective gears 178, 180 mounted to the ends of the shafts 110b, 160b of the upper transfer elements 110, 160. The gears 178, 180 are connected by a belt 182. A gear 184 is mounted to the shaft 180b of the second transport element so as to engage with the intermediate gear 176. The gear assembly transmits the rotation from the first driven transport elements 108, 158 to the second transport elements 110, 160. The intermediate gear 176 is mounted at the position of the pivot shaft 168, so that the first and second transport elements remain coupled with each other when housing parts 154a, 154b are open.

Figure 9B:
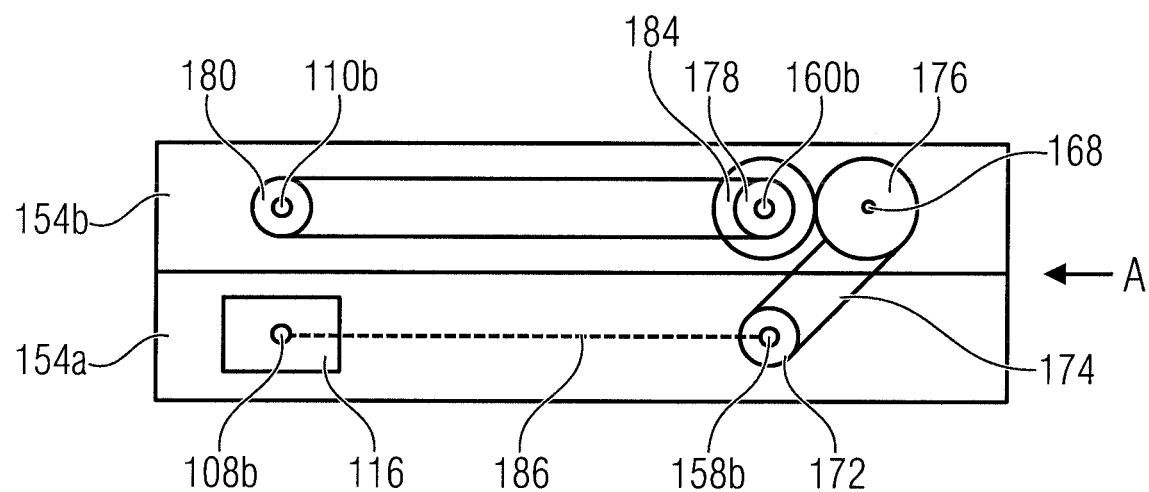
FIG. 9B is a schematic illustration of the device of FIG. 9A in a side view with the housing parts closed.

FIG. 9E is a schematic illustration of the device of FIG. 9A in a side view with the housing parts 154e, 154b closed. FIG. 9B shows the shaft 108b of the first transport element 108 of the first transport element pair that coupled to the motor 116. The coupling between the first transport element 108, 158 of the first and second transport element pairs is schematically represented at 186.

Figure 9C:
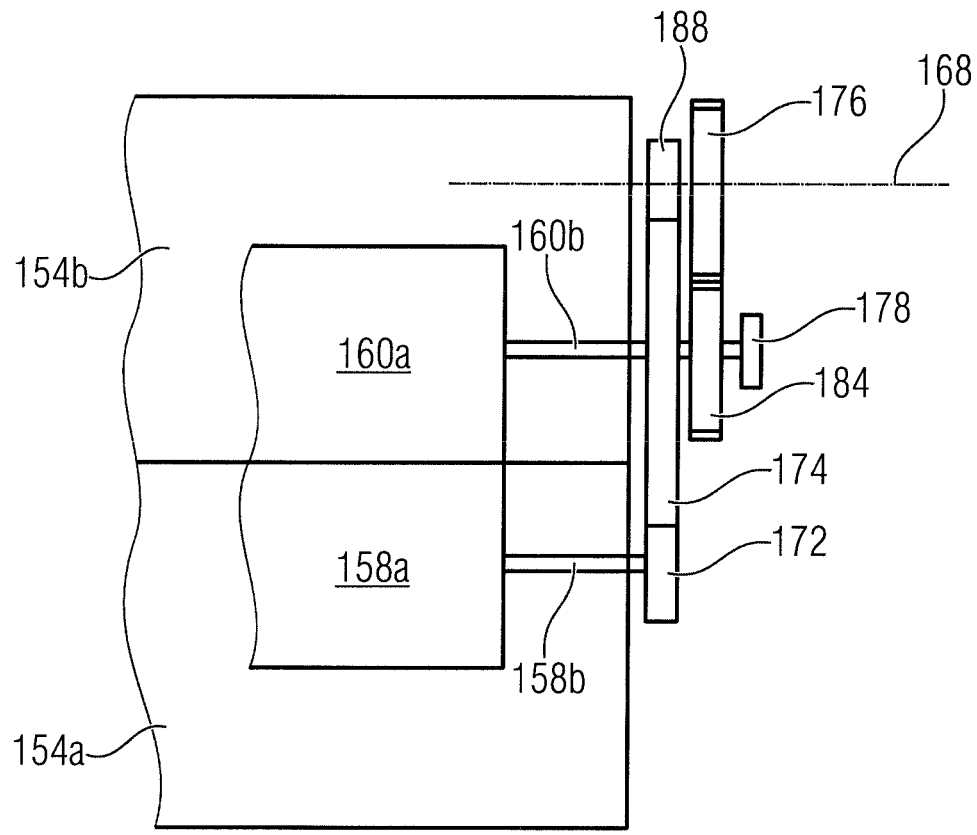
FIG. 9C is a schematic illustration of the device of FIG. GB in a direction A indicated in FIG. 9B.

FIG. 9C is a schematic illustration of the device of FIG. 9B in a direction A indicated in FIG. 9B. FIG. 9B shows the second gear 188, not shown in FIG. 9A, and mounted at the location of the pivot axis 188.

Figure 10:
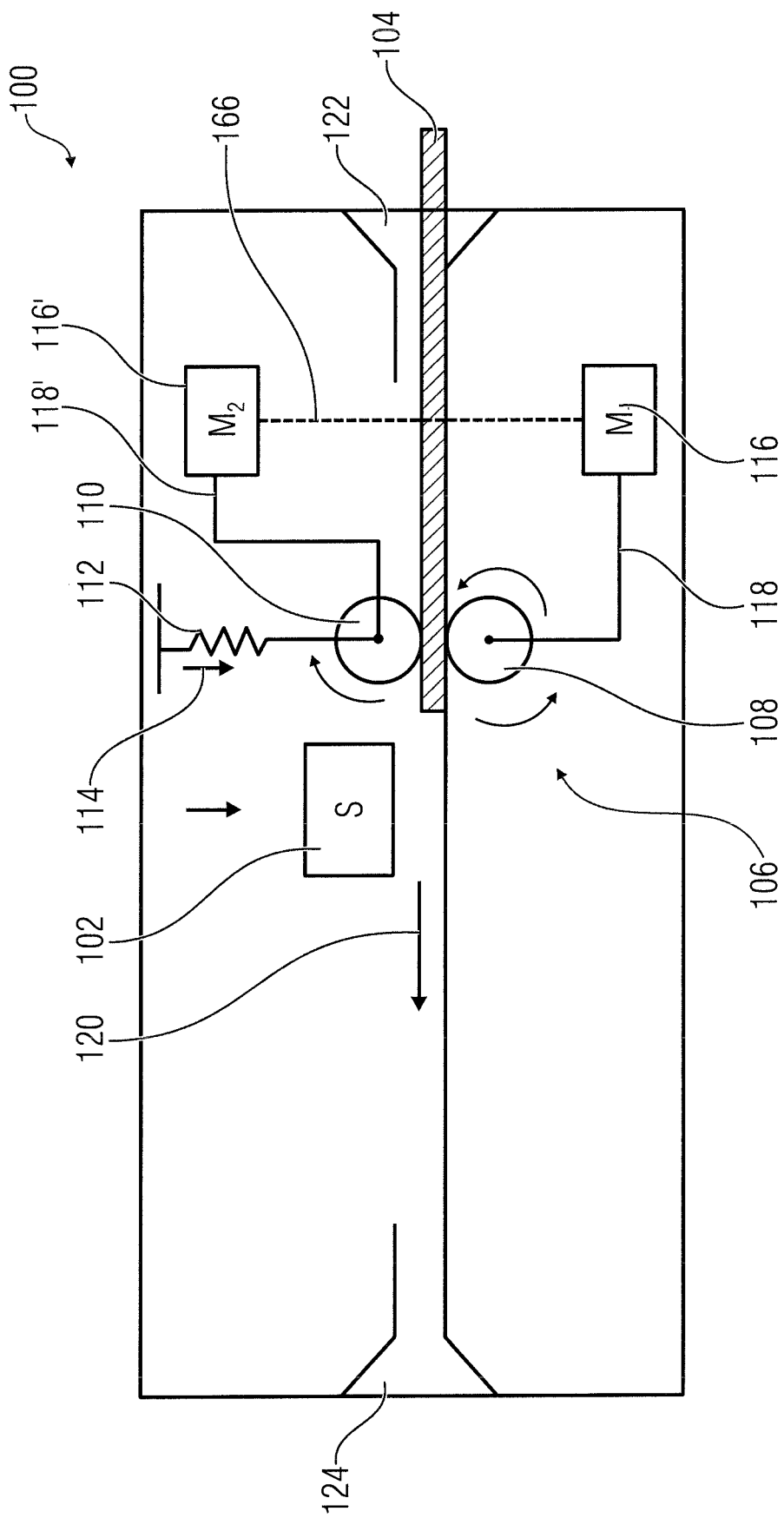
FIG. 10 is a schematic illustration of an image digitizing apparatus in accordance with yet another example.

FIG. 10 shows a scanner in accordance with another example. The scanner 100 includes the elements described above with reference to the example of FIG. 5. Other than in the examples described so far, rather than coupling the second transport element to the first transport element by a mechanical coupling for also driving the second transport element, in the example of FIG. 10, a second motor 116' is provided that is coupled to the second transport element, as depicted schematically by the line 118' so that the second transport element 110 is driven by the further motor 116'. The two motors are operated to drive the transport elements 108, 110 in synchronism, as is schematically represented by the line 16. Driving the second transport element 110 by the further motor 116' allows adding traction force to the medium 104 in a similar way as when coupling the two transport elements, thereby avoiding sliding of the medium and defects in the scanned image. In accordance with examples, also the scanners described above may include, instead of the mechanical coupling of the respective transport elements, the further motor 116' for driving the second transport element in synchronism with the first transport element.

In accordance with examples, the scanner having the motors 116, 116' may have a double medium separation function to avoid loading more than one medium for scanning into the scanner. Loading two media at the same time into the scanner forces the user to repeat the scanning process, thereby increasing the overall time for scanning. The motors 116, 116' may be controlled independent from each other so that, when loading media to be scanned into the scanner, one of the transport element 108 or 110 is stopped or both are operated to rotate in the same direction. This causes the separation of the two media. Once the separation is completed, the motors are controlled to operate in synchronism with each other so that the transport elements 108, 110 rotate in opposite directions to move the medium for scanning past the sensor 102.

Figure 11:
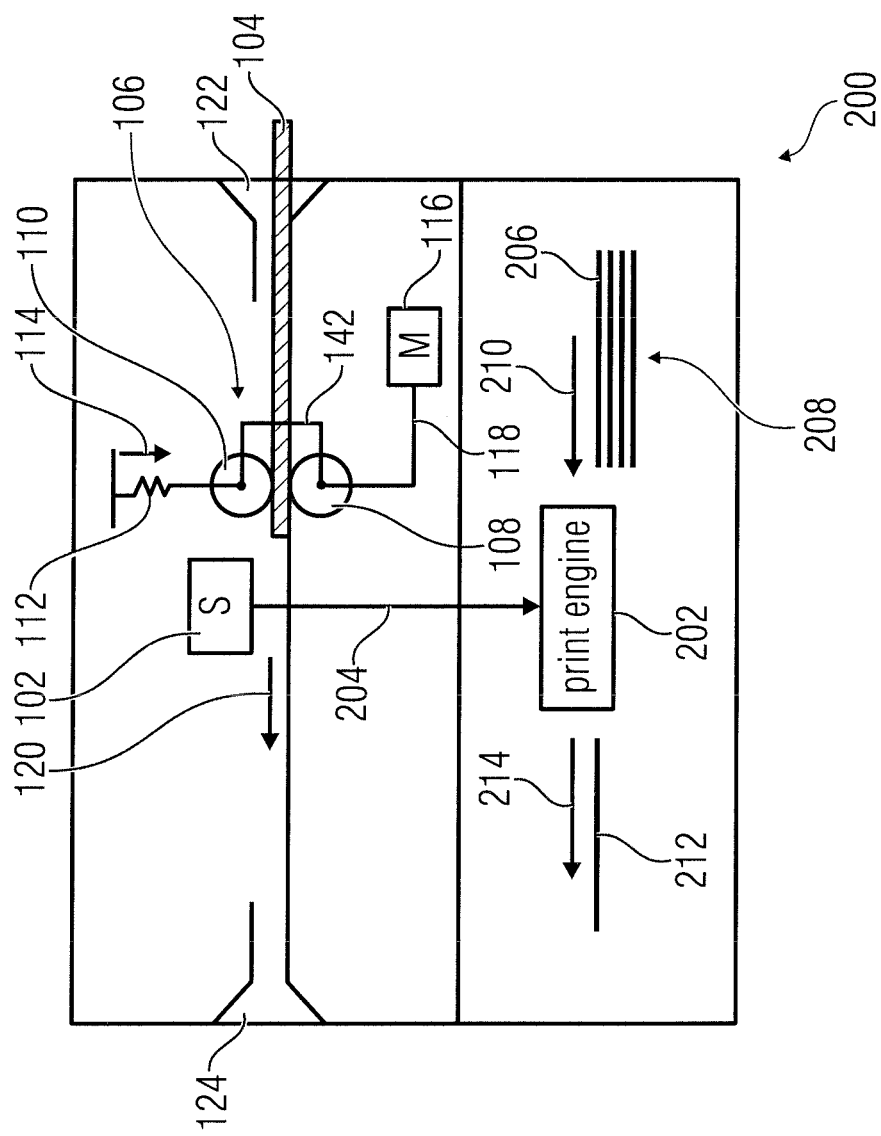
FIG. 11 is a schematic illustration of an image printing apparatus 200 in accordance with an example.

The examples described above refer to an image digitizing apparatus, such as a scanner, which may be a stand-alone device to allow scanning images from media. In accordance with other examples, the image digitizing apparatus may be pert of an image forming apparatus for printing the scanned image. FIG. 11 is a schematic illustration of an image printing apparatus 200 in accordance with an example. The image forming apparatus 200 includes an image digitizing device or scanner as described in the above examples. The scanner may have a structure as described above with reference to FIG. 5 in which the respective transport elements of the transport 108 are mechanically coupled with each other. In accordance with other examples, the scanning device of the image forming apparatus 200 may be a scanner as described in the other examples above. The image forming apparatus 200 includes a print engine 202, for example an electrophotographic print engine or an ink jet print engine. As is schematically indicated by line 204, the print engine 202 is coupled to the sensor 102 so as to receive data representing the scanned image. The print engine receives a print medium 206, for example, from an input tray 208 holding a plurality of print media. The print medium 206 is forwarded to the print engine, as is indicated by arrow 210, is processed by the print engine 202 so as to generate an image on the print medium using the image data received from the sensor 102 of the scanning unit, and a printed medium 212 is output from the print engine, as is indicated by arrow 214.

Figure 12:
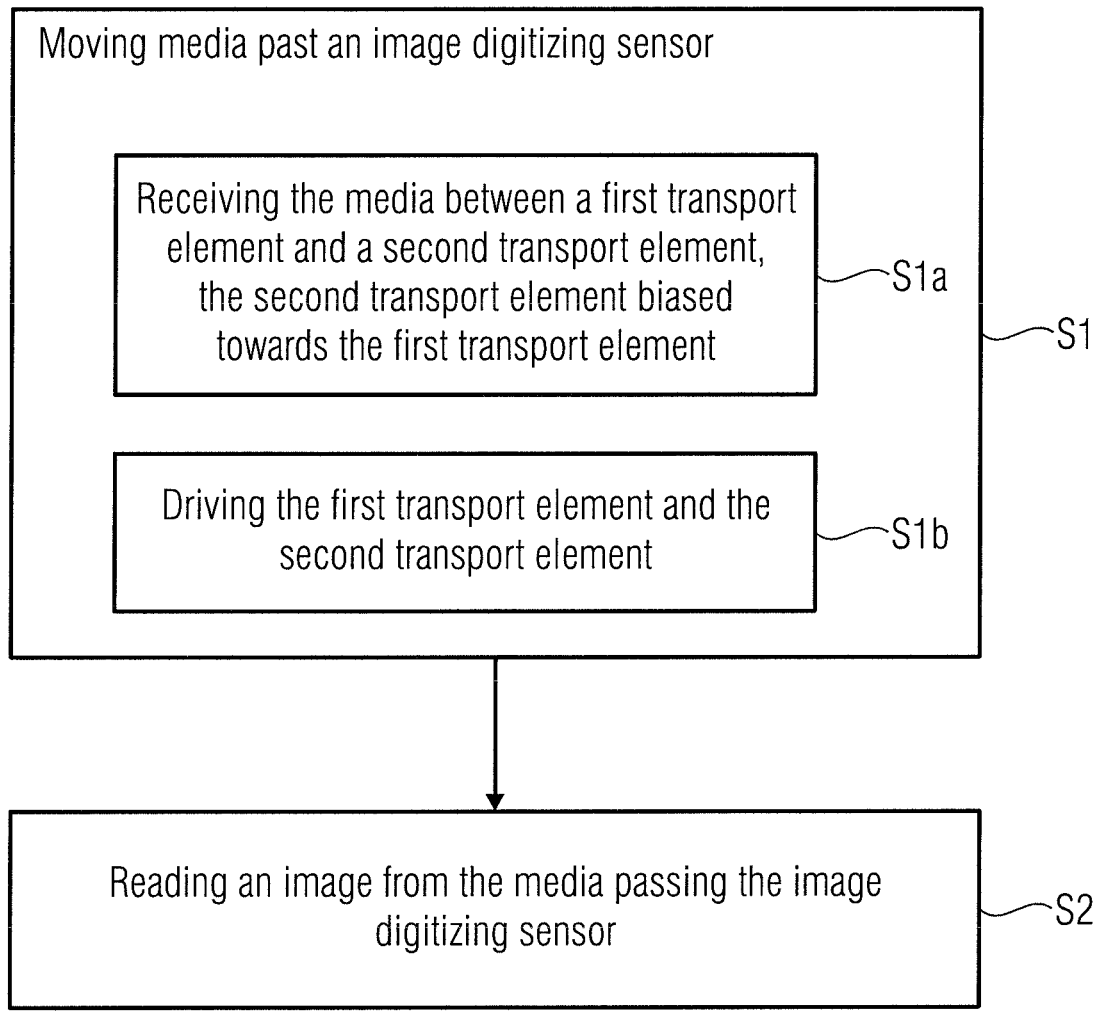
FIG. 12 is a flow diagram of a method for digitizing an image in accordance with an example.

FIG. 12 is a flow diagram of a method for digitizing an image in accordance with an example. To digitize an image, the media bearing the image is moved S1 past an image digitizing sensor. The image is read S2 from the media passing the image digitizing sensor. Moving the media includes receiving S1a the media between a first transport element and a second transport element. The second transport element is biased towards the first transport element. The first transport element and the second transport element are both driven S1b.

Although some aspects of the techniques described herein have been described in the context of an apparatus, these aspects may also represent a description of corresponding method blocks. Analogously, aspects described in the context of a method also represent a description of corresponding blocks or items or features of a corresponding apparatus.

All of the features disclosed in this specification, including any accompanying claims, abstract and drawings, and/or all of the method books or processes so disclosed may be combined in any combination, except comminations where at least some of the features are mutually exclusive. Each feature disclosed in this specification, including any accompanying claims, abstract and drawings, may be replaced by features serving the same, equivalent or similar purpose, unless expressly stated otherwise. Thus, unless expressly stated otherwise, each feature disclosed is an example of a generic series of equivalent or similar features.

The invention claimed is:

1. An image digitizing apparatus, comprising:
    an image digitizing sensor to read an image from media passing the image digitizing sensor;
    a transport to move the media past the image digitizing sensor, the transport including:
        a first driven transport element; and
        a second driven transport element biased towards the first driven transport element, the first driven transport element and the second driven transport element to receive the media therebetween; and
    a gear mechanism to couple the first driven transport element and the second driven transport element so that the second driven transport element is driven in synchronism with the first driven transport element, the gear mechanism comprising:
        a first belt drive roller mounted to the first driven transport element,
        a second belt drive roller,
        a drive belt arranged around the first belt drive roller and the second belt drive roller,
        a gear mounted to the second driven transport element, and
        an intermediate gear to engage the gear, the intermediate gear to rotate together with the second belt drive roller.

2. The image digitizing apparatus of claim 1, comprising a housing including a first housing part and a second housing part, the first housing part and the second housing part movable with respect to each other,
    wherein the first driven transport element is mounted to the first housing part,
    wherein the second driven transport element is mounted to the second housing part, and
    wherein the image digitizing sensor is mounted to one of the first and second housing parts.

3. The image digitizing apparatus of claim 2, wherein:
    one of the first and second housing parts is to be pivoted around a pivot axis, and
    the second belt drive roller is mounted at the pivot axis.

4. The image digitizing apparatus of claim 1, wherein:
    the first driven transport element and the second driven transport element are a first pair of driven transport elements to receive the media therebetween,
    the transport includes a second pair of driven transport elements to receive the media therebetween, the second pair of driven transport elements arranged, with respect to a movement direction of the media past the image digitizing sensor, downstream of the first pair of driven transport elements,
    the second pair of driven transport elements includes a third driven transport element and a fourth driven transport element, and wherein the fourth driven transport element is biased towards the third driven transport element, and
    the image digitizing sensor is arranged between the first pair of driven transport elements and the second pair of driven transport elements.

5. The image digitizing apparatus of claim 1, wherein the image digitizing sensor includes a plurality of sensor elements extending across a width in a direction perpendicular to a movement direction of the media past the image digitizing sensor.

6. The image digitizing apparatus of claim 1, comprising a large format scanner.

7. The image digitizing apparatus of claim 1, wherein a first engagement surface of the first driven transport element has a friction coefficient of at least 1.2, and a second engagement surface of the second driven transport element has a friction coefficient of at least 1.2, the first and second engagement surfaces to engage the media.

8. The image digitizing apparatus of claim 1, wherein a first engagement surface of the first driven transport element has a friction coefficient of at least 1.6, and a second engagement surface of the second driven transport element has a friction coefficient of at least 1.6, the first and second engagement surfaces to engage the media.

9. An image digitizing apparatus, comprising:
    an image digitizing sensor to read an image from media passing the image digitizing sensor;
    a transport to move the media past the image digitizing sensor, the transport including:
        a first driven transport element and
        a second driven transport element biased towards the first driven transport element, the first driven transport element and the second driven transport element to receive the media therebetween; and
    a gear mechanism to couple the first driven transport element and the second driven transport element so that the second driven transport element is driven in synchronism with the first driven transport element,
    wherein the image digitizing sensor includes a plurality of sensor elements extending across a width in a direction perpendicular to a movement direction of the media past the image digitizing sensor, the plurality of sensor elements including a plurality of first sensor elements and a plurality of second sensor elements,
    the plurality of first sensor elements being arranged to define a first scanning zone across the width, wherein a gap is provided between adjacent first sensor elements of the plurality of first sensor elements,
    the plurality of second sensor elements being arranged to define a second scanning zone across the width, wherein a gap is provided between adjacent second sensor elements of the plurality of second sensor elements, wherein the second scanning zone, with respect to the movement direction of the media past the image digitizing sensor, is located downstream of the first scanning zone, and
    the plurality of first sensor elements and the plurality of second sensor elements being arranged so that a first sensor element partially overlaps a second sensor element along the width.

10. The image digitizing apparatus of claim 9, wherein:
    the gear mechanism includes a first gear mounted to the first driven transport element, and a second gear mounted to the second driven transport element, and
    the first gear and the second gear engage with each other.

11. The image digitizing apparatus of claim 9, wherein the first driven transport element includes a first roller, and the second driven transport element includes a second roller to cooperate with the first roller to engage the media.

12. The image digitizing apparatus of claim 9, wherein the first driven transport element includes a first shaft comprising a plurality of first discs axially spaced along the first shaft, and the second driven transport element includes a second shaft comprising a plurality of second discs axially spaced along the second shaft, the plurality of first discs and the plurality of second discs to engage the media.

13. An image forming apparatus, comprising:
an image digitizing sensor to read an image from media passing the image digitizing sensor;
a transport to move the media past the image digitizing sensor, wherein the transport includes a first driven transport element and a second driven transport element biased towards the first driven transport element, the first driven transport element and the second driven transport element to receive the media therebetween, wherein the first driven transport element includes a first belt, and the second driven transport element includes a second belt, the first and second belts to engage the media; and
a mechanical coupling mechanism comprising a first rotatable element connected to the first driven transport element, and a second rotatable element connected to the second driven transport element, the first rotatable element rotatable with rotation of the first driven transport element, and the second rotatable element rotatable with rotation of the second driven transport element, and wherein the first and second rotatable elements are engaged with one another so that the first and second driven transport elements are driven in synchronism with one another.

14. The image forming apparatus of claim 13, further comprising:
a first motor to drive the first driven transport element; and
a second motor to drive the second driven transport element, wherein the first motor and the second motor are to be operated in synchronism with each other, wherein the first and second motors are to be controlled independent from each other to avoid loading more than one media for scanning, the first and second motors operable so that, when loading a given media to be scanned into the image digitizing apparatus, the first driven transport element or the second driven transport element is stopped or both the first driven transport element and the second driven transport element rotate in the same direction, and, once a separation of multiple media is completed, the first and second motors are to rotate in opposite directions to move the given media past the image digitizing sensor.

15. The image forming apparatus of claim 13, wherein the first rotatable element comprises a first gear, and the second rotatable element comprises a second gear.

16. The image forming apparatus of claim 13, wherein the first rotatable element comprises a first friction wheel, and the second rotatable element comprises a second friction wheel.

17. The image forming apparatus of claim 13, wherein the first rotatable element is connected to the first driven transport element by a first shaft, and the second rotatable element is connected to the first driven transport element by a second shaft.

18. The image forming apparatus of claim 13, wherein a first engagement surface of the first driven transport element has a friction coefficient of at least 1.6, and a second engagement surface of the second driven transport element has a friction coefficient of at least 1.6, the first and second engagement surfaces to engage the media.

* * * * *